(12) United States Patent
Fukushima et al.

(10) Patent No.: US 7,903,539 B2
(45) Date of Patent: Mar. 8, 2011

(54) ELECTRONIC CONTROL UNIT

(75) Inventors: Takaaki Fukushima, Kobe (JP); Yousuke Matsumoto, Kobe (JP); Akira Miki, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 1050 days.

(21) Appl. No.: 11/709,133

(22) Filed: Feb. 22, 2007

(65) Prior Publication Data
US 2007/0203624 A1    Aug. 30, 2007

(30) Foreign Application Priority Data

Feb. 28, 2006   (JP) ................................ 2006-052831

(51) Int. Cl.
G06F 11/00   (2006.01)
H04J 3/14    (2006.01)

(52) U.S. Cl. .................... 370/216; 370/242; 370/250

(58) Field of Classification Search .................... None
See application file for complete search history.

(56) References Cited

U.S. PATENT DOCUMENTS

| | | | |
|---|---|---|---|
| 5,134,618 A | 7/1992 | Matt et al. | |
| 5,968,100 A | 10/1999 | Kayano et al. | |
| 6,275,510 B1 * | 8/2001 | Koenig et al. | 370/535 |
| 6,608,844 B1 * | 8/2003 | Teodorescu et al. | 370/512 |
| 6,725,408 B1 * | 4/2004 | Cao et al. | 714/738 |
| 7,213,185 B2 * | 5/2007 | Barone et | 714/733 |
| 7,685,486 B1 * | 3/2010 | Lai | 714/725 |
| 2002/0131116 A1 * | 9/2002 | Shimomura et al. | 359/124 |
| 2004/0156239 A1 * | 8/2004 | Funaki | 365/185.22 |

FOREIGN PATENT DOCUMENTS

| | | |
|---|---|---|
| JP | A 2-238379 | 9/1990 |
| JP | A 2-287744 | 11/1990 |
| JP | A-4-170601 | 6/1992 |
| JP | A 5-101228 | 4/1993 |
| JP | A 5-127933 | 5/1993 |
| JP | A 7-248882 | 9/1995 |
| JP | A 8-22308 | 1/1996 |
| JP | A-8-98389 | 4/1996 |
| JP | A-8-98390 | 4/1996 |
| JP | B2 3202382 | 8/2001 |
| JP | A-2004-199216 | 7/2004 |
| JP | A 2005-49967 | 2/2005 |

OTHER PUBLICATIONS

Jul. 20, 2010 Office Action issued in Japanese Patent Application No. 2006-052831 (with partial translation).

* cited by examiner

Primary Examiner — Chi H Pham
Assistant Examiner — Soon-Dong D Hyun
(74) Attorney, Agent, or Firm — Oliff & Berridge, PLC

(57) ABSTRACT

An electronic control unit includes an input interface having multiplexer circuits, each of which circuits is supplied with input signals supplied from an outside of the electronic control unit, and a failsafe processing part that determines whether an abnormality occurs in the input interface by referring to a state of a specific multiplexer circuit that is at least one of the multiple multiplexer circuits when determining that an output signal of the input interface has an abnormal state and executes a failsafe process based on results of determination as to whether an abnormality occurs in the specific multiplexer circuit.

6 Claims, 5 Drawing Sheets

ELECTRONIC CONTROL UNIT

BACKGROUND OF THE INVENTION

1. Field of the Invention

This invention generally relates to electronic control units applicable to vehicles, and more particularly to a failsafe process.

2. Description of the Related Art

In recent years, an increased number of electrical components on the vehicle has been used to improve vehicle safety and conformability, and a lot of more complicated vehicle controls has been needed. There is an increased number of signals supplied to electronic control units from sensors and switches for the purpose of various vehicle controls.

Each electronic control unit is equipped with a processor, which is capable of receiving a limited number of input signals. Therefore, one or more multiplexer circuits are provided at the input interface of the electronic control unit in order to handle more input signals. This kind of technique is disclosed in the following documents: Japanese Patent Application Publication No. 8-22308; Japanese Patent Application Publication No. 2-238379; Japanese Patent Application Publication No. 2-287744; and Japanese Patent No. 3202382.

A failsafe process should be executed to ensure the maximum safety if an abnormality occurs in any of the signals from the sensors and switches applied to the on-vehicle electronic control unit, particularly, in any of signals directly involved in travel control of vehicle. However, the conventional failsafe process has the following problem. If the input interface becomes faulty, the electronic control unit cannot discriminate abnormality in the input interface from that in the signals from the sensors and switches. This prevents reliable execution of the failsafe process.

The multiplexer circuits in the input interface may always be monitored in order to detect abnormality. This monitoring should be carried out by the electronic control unit when each multiplexer circuit is idle. This increases the load of the electronic control unit.

SUMMARY OF THE INVENTION

The present invention has been made in view of the above circumstances and provides an electronic control unit capable of executing reliable failsafe process.

According to an aspect of the present invention, there is provided an electronic control unit including: an input interface having multiplexer circuits, each of which circuits is supplied with input signals supplied from an outside of the electronic control unit; and a failsafe processing part that determines whether an abnormality occurs in the input interface by referring to a state of a specific multiplexer circuit that is at least one of the multiple multiplexer circuits when determining that an output signal of the input interface has an abnormal state and executes a failsafe process based on results of determination as to whether an abnormality occurs in the specific multiplexer circuit.

The electronic control unit may be configured so that, when the failsafe processing part detects an abnormality in the specific multiplexer circuit, the failsafe processing part executes the failsafe process using the input signals supplied before the abnormality in the specific multiplexer circuit is detected.

The electronic control unit may be configured so that, when the failsafe processing part determines that no abnormality occurs in the specific multiplexer circuit, the failsafe processing part executes the failsafe process based on the abnormal state of the output signal of the input interface.

The electronic control unit may be configured so that: the specific multiplexer circuit is supplied with input signals set to different logical levels; and the failsafe processing part refers to an output signal of the specific multiplexer circuit in order to detect an abnormality that occurs in the specific multiplexer circuit.

The electronic control unit may be configured so that: the input signals supplied from the outside of the electronic control unit includes a signal about a state of a vehicle on which the electronic control unit is mounted; and the failsafe processing part executes the failsafe process directed to ensuring vehicle security when an abnormality in the specific multiplexer circuit is detected.

The electronic control unit may be configured so that the failsafe processing part applies a pulse signal to the specific multiplexer circuit and determines whether the specific multiplexer circuit has an output signal that coincides with the pulse signal.

The electronic control unit may be configured so as to further include a switch connected between an input of the specific multiplexer circuit and a predetermined potential, wherein the failsafe processing part causes the switch to turn ON and OFF and determines, based on an output signal of the specific multiplexer circuit, whether an abnormality occurs in the input interface.

The electronic control unit may be configured to further include another specific multiplexer circuit that is another one of the multiplexer circuits, wherein the failsafe processing part refers to a state of said another specific multiplexer circuit in addition to the state of said specific multiplexer circuit in order to determine whether an abnormality occurs in the input interface.

The electronic control unit may be configured so as to further include: a switch having an end connected to a first input of the specific multiplexer circuit and a second input of the another specific multiplexer circuit and a second end connected to ground; and an inverter connected to the end of the switch and the first input of the specific multiplexer circuit, wherein the failsafe processing part causes the switch to turn ON and OFF and determines, based on output signals of the specific multiplexer circuit and the another multiplexer circuit, whether an abnormality occurs in the input interface.

The electronic control unit may be configured so that the failsafe processing part is implemented in an operation processing section.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
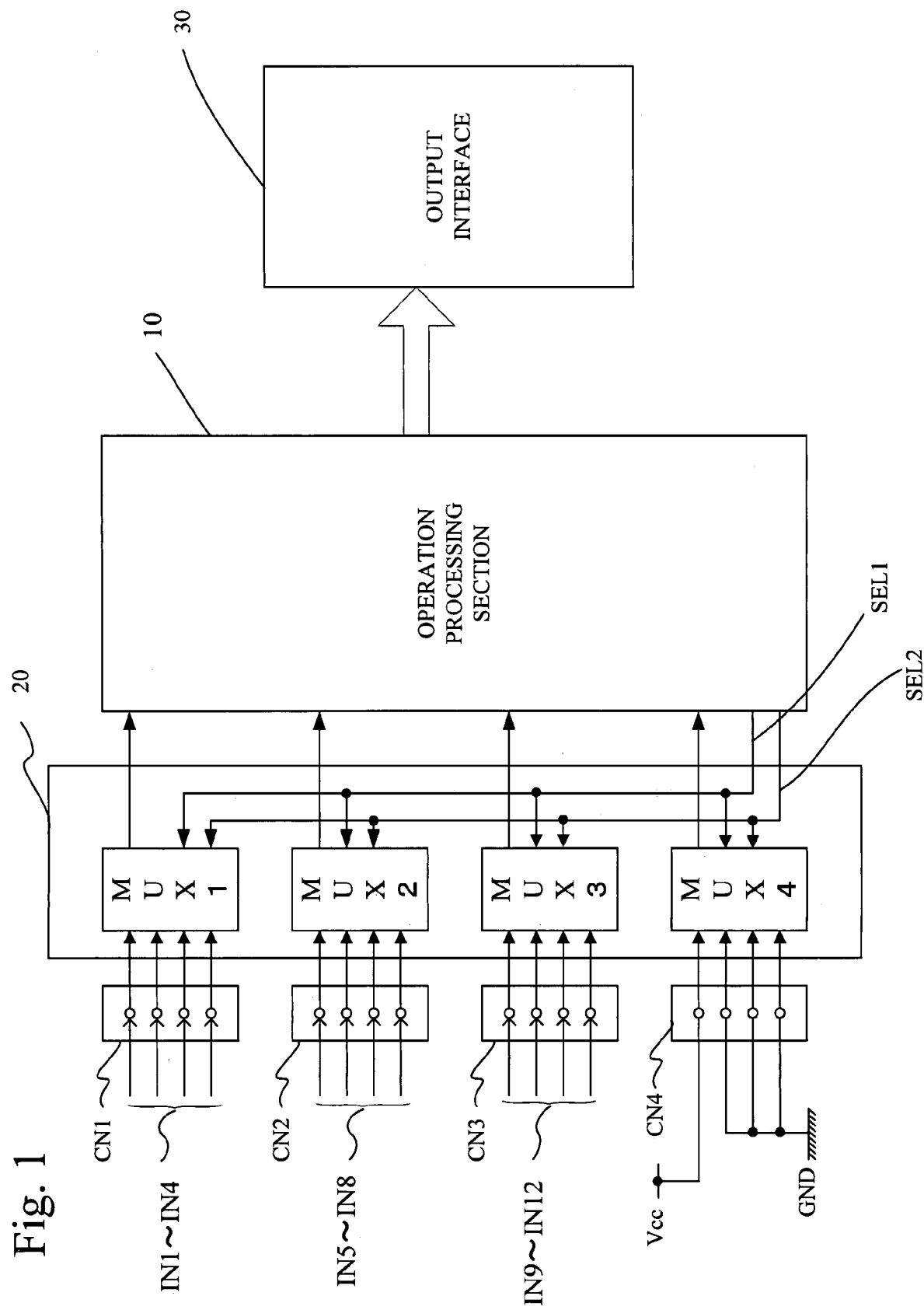
FIG. 1 a block diagram of an electronic control unit in accordance with an embodiment of the present invention.

FIG. 1 is a block diagram of an electronic control unit in accordance with an embodiment of the present invention. The electronic control unit may, for example, be a transmission control of vehicle.

Referring to FIG. 1, the electronic control unit includes an operation processing section 10, an input interface 20, an output interface 30 and multiple connector terminals CN1 through CN4. The input interface 20 includes multiple multiplexer circuits MUX1 through MUX4. Each of the multiplexer circuits MUX1 through MUX4 has four inputs, to which connectors CN1 through CN4 are respectively connected. Each of the connectors CN1 through CN4 has four terminals.

The multiplexer circuits MUX1 through MUX4 are connected to common select signal lines SEL1 and SEL2, and are provided with a select signal through the lines SEL1 and SEL2. The select signal is defined in combination with "0" and "1" on the signal lines SEL1 and SEL2. Each of the multiplexer circuits MUX1 through MUX4 selects one of the four input signals in accordance with the four combinations of "0" and "1" on SEL1 and SEL2. The signals selected by the multiplexer circuits MUX1 through MUX4 are applied to the operation processing section 10. The four input signals of the multiplexer circuit MUX1 are denoted as IN1 through IN4, and those of the multiplexer circuit MUX2 are denoted as IN5 through IN8. Further, the four input signals of the multiplexer circuit MUX3 are denoted as IN9 through IN12. These signals IN1 through IN12 supplied from the outside of the electronic control unit will be referred to as external input signals IN simply. The multiplexer circuit MUX4 is specifically used to detect abnormality. One of the four input signals of the multiplexer circuit MUX4 receives a given voltage Vcc, and the three remaining input signals are connected to ground GND.

The external input signals IN may be a shift lever position detecting signal, and signals from sensors and switches involved in transmission control to which the electronic control unit shown in FIG. 1 is applied. The signals from the sensors and switches may express the current operation or state of the vehicle.

The operation processing section 10 may include a hardware structure and a software structure. The hardware structure may include a processor, memories such as ROM and RAM, an A/D converter, and a D/A converter. The A/D converter converts analog signals from the input interface 20 into digital signals. The D/A converter converts digital signals from the processor into analog signals. The software structure may include a program necessary for transmission control of vehicle and a program for the failsafe process executed when an abnormality occurs. The operation processing section 10 is supplied with the external input signals IN via the input interface 20, and outputs various signals necessary for, for example, the transmission control to the output interface 30.

In the failsafe process, the operation processing section 10 may output the select signal via the select signal lines SEL1 and SEL2 for every 1 ms in order to sequentially read the external input signals IN. Then, the operation processing section 10 refers to the states of the external input signals IN and determines whether an abnormality occurs.

In accordance with instructions from the operation processing section 10, the output interface 30 outputs the control signals and data to external devices provided outside of the electronic control unit shown in FIG. 1, such as parts of the transmission system.

Figure 2:
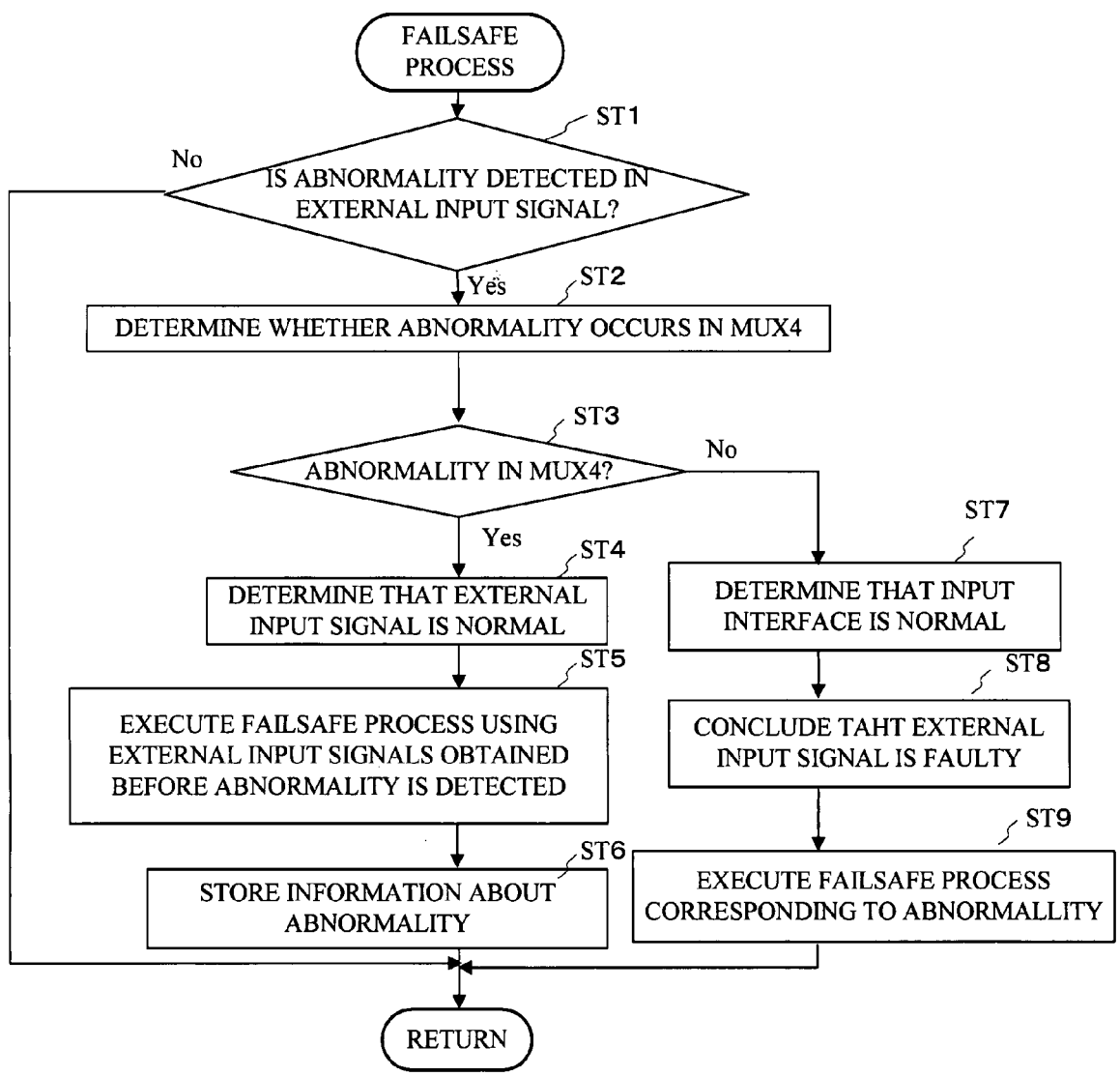
FIG. 2 is a flowchart of a failsafe process executed in the electronic control unit shown in FIG. 1.

A description will now be given, with reference to FIG. 2, of an example of the failsafe process executed by the operation processing section 10 of the electronic control unit. The operation processing section 10 periodically executes the failsafe process shown in FIG. 2 while executing various controls involved in transmission control.

The operation processing section 10 refers to the external input signals IN from the input interface 20 and determines whether an abnormality occurs (step ST1). When no abnormality is detected, the operation processing section 10 ends the process. When an abnormality is detected, the operation processing section 10 reads the output of the multiplexer circuit MUX4 specifically assigned to abnormality detection, and determines whether an abnormality occurs in the multiplexer circuit MUX4 (step ST2).

It should be noted that one of the four inputs of the multiplexer circuit MUX4 is set at the given potential Vcc, and the three remaining inputs are set at the ground potential GND. The operation processing section 10 uses the four input signals to determine whether an abnormality occurs in the multiplexer circuit MUX4 (step ST3). More particularly, the operation processing section 10 determines whether a predetermined logical operation on the fourth inputs of the multiplexer circuit MUX4 results in a predetermined value obtained when no abnormality occurs. When the predetermined value is obtained, no abnormality occurs in the multiplexer circuit MUX4. In contrast, when a value other than the predetermined value is obtained, an abnormality occurs in the multiplexer circuit MUX4.

When no abnormality is detected in the multiplexer circuit MUX4, the operation processing section 10 determines that the input interface 20 operates normally (step ST7), and determines that an abnormality occurs in the external input signals (step ST8). In other words, it is determined whether the external input signals have an abnormal state. Then, the operation processing section 10 executes the failsafe process having an appropriate content that is predetermined on the basis of the state of the external input signals IN (step ST9). Thus, the appropriate failsafe process for an abnormality in the vehicle can be executed reliably.

When the operation processing section 10 determines, at step ST3, that an abnormality occurs in the multiplexer circuit MUX4, the operation processing section 10 determines that the external input signals IN have no abnormality (step ST4). When an abnormality occurs in the multiplexer circuit MUX4, it can be determined that the input interface 20 is faulty as a whole. It is known that in most cases, an abnormality occurs on the select signal lines SEL1 and SEL2 to which the multiplexer circuits MUX1 through MUX4 are connected. Thus, if one of the multiplexer circuits MUX1 through MUX4 becomes faulty and affects any of the signal lines SEL1 and SEL2, each of the multiplexer circuits MUX1 through MUX4 will not operate normally. From the above viewpoint, it is sufficient to monitor only a part of the multiplexer circuits MUX1 through MUX4 (at least one multiplexer circuit; MUX4 is assigned as such a specific multiplexer circuit in the present embodiment) and determine whether an abnormality occurs in the monitored part. If an abnormality is detected in the monitored part, it can be concluded that the whole input interface 20 becomes faulty. It is therefore possible to discriminate abnormality in the input interface 20 from that in the external input signals IN and execute an appropriate failsafe process reliably.

The operation processing section 10 uses the normal external input signals IN prior to detection of the abnormality at step ST1, and executes the failsafe process for ensuring security, such as evacuation of the vehicle to a road shoulder (step ST5). It should be noted that the external input signals IN obtained after detection of the abnormality may be likely to indicate an abnormal value or state because the input interface 20 is faulty as a whole. If the faulty external input signals IN are used for vehicle control, the failsafe process cannot be carried out reliably.

The operation processing section 10 stores information indicative of the occurrence of an abnormality that occurs in the multiplexer circuit MUX4 in a built-in memory (step ST6). The information stored in the built-in memory may be used to analyze the abnormality by the dealer and enable quick vehicle repair.

As described above, the present embodiments determines whether an abnormality occurs in the multiplexer circuit MUX4 of the input interface 20 by referring to the state of the external input signals prior to execution of the failsafe process, and changes the content of the failsafe process so as to correspond to the abnormality detected at step ST3. The failsafe process thus executed is more reliable.

Figure 3:
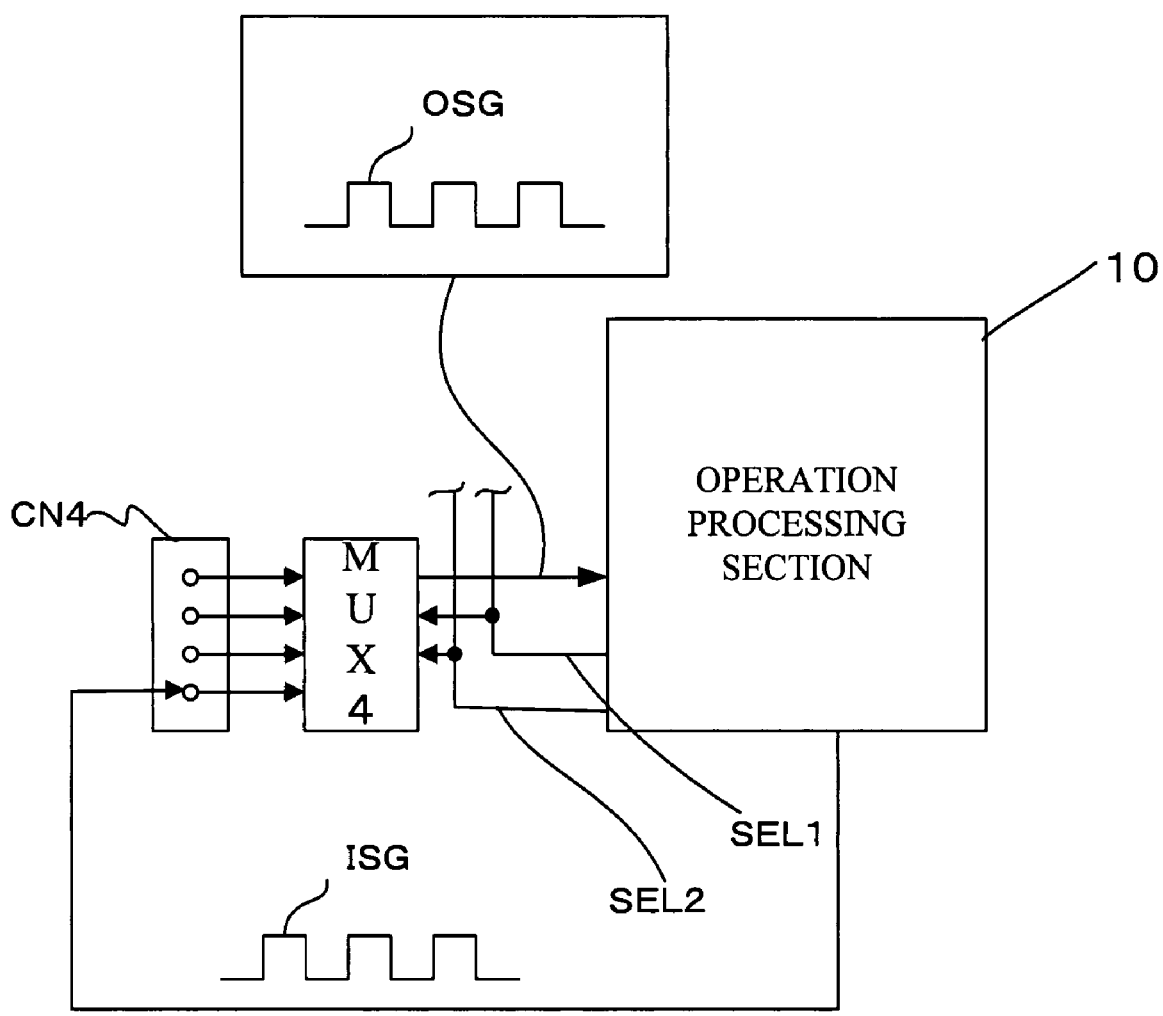
FIG. 3 is a block diagram of an abnormality detecting configuration other than that employed in the configuration shown in FIG. 1.

In the above-mentioned embodiment, the entire multiplexer circuit MUX4 is assigned to detection of an abnormality that occurs in the input interface 20. The present invention includes another configuration, which is exemplarily shown in FIG. 3. As shown in FIG. 3, the operation processing section 10 supplies one of the four inputs of the multiplexer circuit MUX4 with an input signal ISG, which is specifically used for abnormality detection and has a rectangular waveform. The three remaining inputs of the multiplexer circuit MUX4 are used for a given control. The operation processing section 10 compares the input signal ISG with an output signal OSG output from the multiplexer circuit MUX4. The operation processing section 10 determines that the multiplexer circuit MUX4 is operating normally when the signals ISG and OSG coincide with each other, and determines that an abnormality occurs in the multiplexer circuit MUX4, if not.

The configuration shown in FIG. 3 uses only one input for abnormality detection of the multiplexer circuit MUX4, in other words, the input interface 20. Further, the use of the rectangular waveform signal ISG makes it possible to detect an abnormality in the multiplexer circuit MUX4 more reliably.

Figure 4:
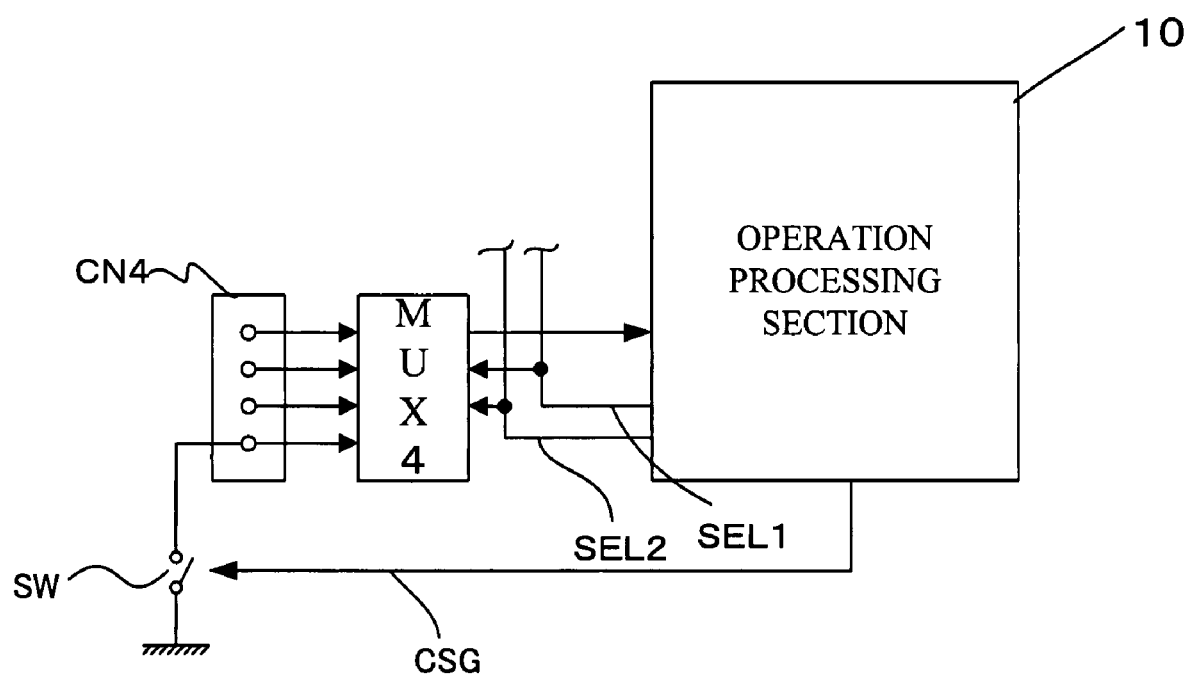
FIG. 4 is a block diagram of yet another abnormality detecting configuration.

Yet another configuration for abnormality detection for the multiplexer circuit MUX4 or the input interface 20 may be used. Referring to FIG. 4, the operation processing section 10 supplies a switch SW with a control signal CSG for turning ON and OFF the switch. The switch SW is connected between one of the four inputs of the multiplexer circuit MUX4 and ground. When the switch SW is OFF, the output of the multiplexer circuit MUX4 is in the floating state. When the switch SW is ON, the output of the multiplexer circuit MUX4 is at the ground potential. The operation processing section 10 selects the input to which the switch SW is connected, and refers to the states of the output signal of the multiplexer circuit MUX4 by turning ON and OFF the switch SW. Preferably, the switch SW is turned ON and OFF at timings that do not affect the vehicle control.

Figure 5:
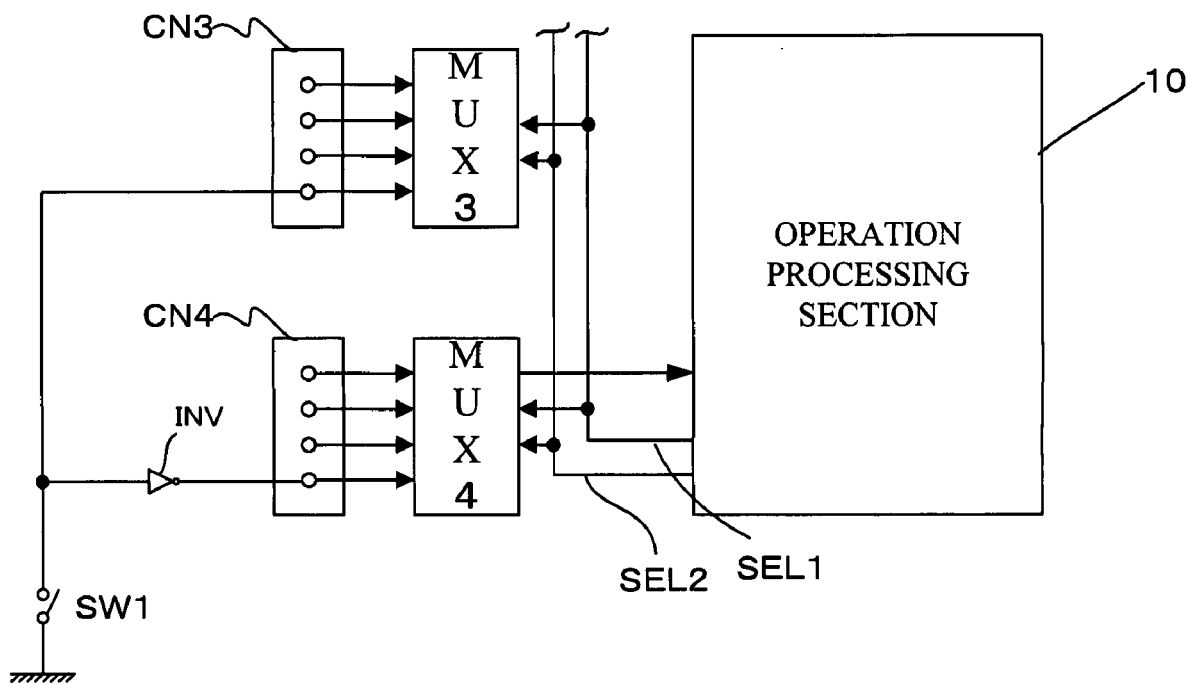
FIG. 5 is a block diagram of a further abnormality detecting configuration.

There is a further configuration for detecting an abnormality in the input interface 20. Referring to FIG. 5, the operation processing section 10 turns ON and OFF a switch SW1 having a terminal grounded. The operation processing section 10 controls the multiplexer circuit MUX3 to select the switch SW1, and controls the multiplexer circuit MUX4 to an inverter INV connected to another terminal of the switch SW1. The operation processing section 10 turns ON the switch SW1. The operation processing section 10 receives the ground potential through the multiplexer circuit MUX3 and the high-potential produced by the inverter INV through the multiplexer circuit MUX4, when the input interface 20 operates normally. If the operation processing section 10 receives identical-level signals from the multiplexer circuits MUX3 and MUX4, the operation processing section 10 determines that an abnormality occurs in the input interface 20.

The present invention includes detection of abnormality that occurs in circuits other than the multiplexer circuits in the input interface 20. The present invention is not limited to the four-input multiplexer circuits but includes other types of multiplexer circuits having an arbitrary number of inputs and/or outputs.

The present invention includes not only the electronic control units for use in vehicles but also electronic control units for industrial machines and electrical equipment.

The present invention is based on Japanese Patent Application No. 2006-052831 filed Feb. 28, 2006, the entire disclosure of which is herein incorporated by reference.

What is claimed is:

1. An electronic control unit comprising:
an input interface including:
a plurality of multiplexer circuits that input a plurality of input signals respectively and output one of the input signals to their output terminals selectively, the plurality of input signals being supplied from an outside of the electronic control unit;
an abnormality detecting multiplexer circuit that has a plurality of input terminals which are set at ground potential or given potential;
select signal lines that are connected to the plurality of multiplexer circuits and the abnormality detecting multiplexer circuit respectively, that provide a first select signal to the plurality of multiplexer circuits, the first select signal dictates a signal the plurality of multiplexer circuits output to their output terminals, and that provide a second select signal to the abnormality detecting multiplexer circuit, the second select signal dictating a potential the abnormality detecting multiplexer circuit outputs to its output terminal;
a determining portion that inputs a plurality of input signals outputted from the output terminals of the plurality of multiplexer circuits, that transmits the second select signal to the abnormality detecting multiplexer circuit through the select signal lines when determining that the input signals have an abnormal state, that determines whether or not the second select signal is supplied to the abnormality detecting multiplexer circuit through the select signal lines based on the potential the abnormality detecting multiplexer circuit outputs in response to the second select signal, and that determines an abnormality occurs in the select signal lines when determining that the second select signal is not supplied to the abnormality detecting multiplexer circuit; and
a failsafe processing part that executes a failsafe process using the input signals supplied before an abnormality in the select signal lines is detected when the determining portion determines that the abnormality occurs in the select signal lines, and determines the abnormality occurs in the input signals when the determining portion determines no abnormality occurs in the select signal lines and that executes a failsafe process based on an abnormal state of the input signals.

2. The electronic control unit as claimed in claim 1, wherein:
the input signals supplied from the outside of the electronic control unit includes a signal about a state of a vehicle on which the electronic control unit is mounted; and the failsafe processing part executes the failsafe process directed to ensuring vehicle security when an abnormality in the specific multiplexer circuit is detected.

3. The electronic control unit as claimed in claim 1, further comprising a switch connected between an input of the abnormality detecting multiplexer circuit and a predetermined potential, wherein the failsafe processing part causes the switch to turn ON and OFF and determines, based on an output signal of the abnormality detecting multiplexer circuit, whether an abnormality occurs in the select signal lines.

4. The electronic control unit as claimed in claim 1, further comprising another abnormality detecting multiplexer circuit that is another one of the multiplexer circuits, wherein the failsafe processing part refers to a state of said another abnormality detecting multiplexer circuit in addition to the state of said abnormality detecting multiplexer circuit in order to determine whether an abnormality occurs in the select signal lines.

5. The electronic control unit as claimed in claim 4, further comprising:
a switch having an end connected to a first input of the abnormality detecting multiplexer circuit and a second input of the another abnormality detecting multiplexer circuit and a second end connected to ground; and
an inverter connected to the end of the switch and the first input of the abnormality detecting multiplexer circuit,
wherein the failsafe processing part causes the switch to turn ON and OFF and determines, based on output signals of the abnormality detecting multiplexer circuit and the another multiplexer circuit, whether an abnormality occurs in the select signal lines.

6. The electronic control unit as claimed in claim 1, wherein the failsafe processing part is implemented in an operation processing section.

\* \* \* \* \*